3,112,791
AIR CONDITIONING CONTROL
Charles B. Brahm, Rockville, Conn., assignor to United
Aircraft Corporation, East Hartford, Conn., a corporation of Delaware
Filed Apr. 16, 1959, Ser. No. 806,842
15 Claims. (Cl. 165—28)

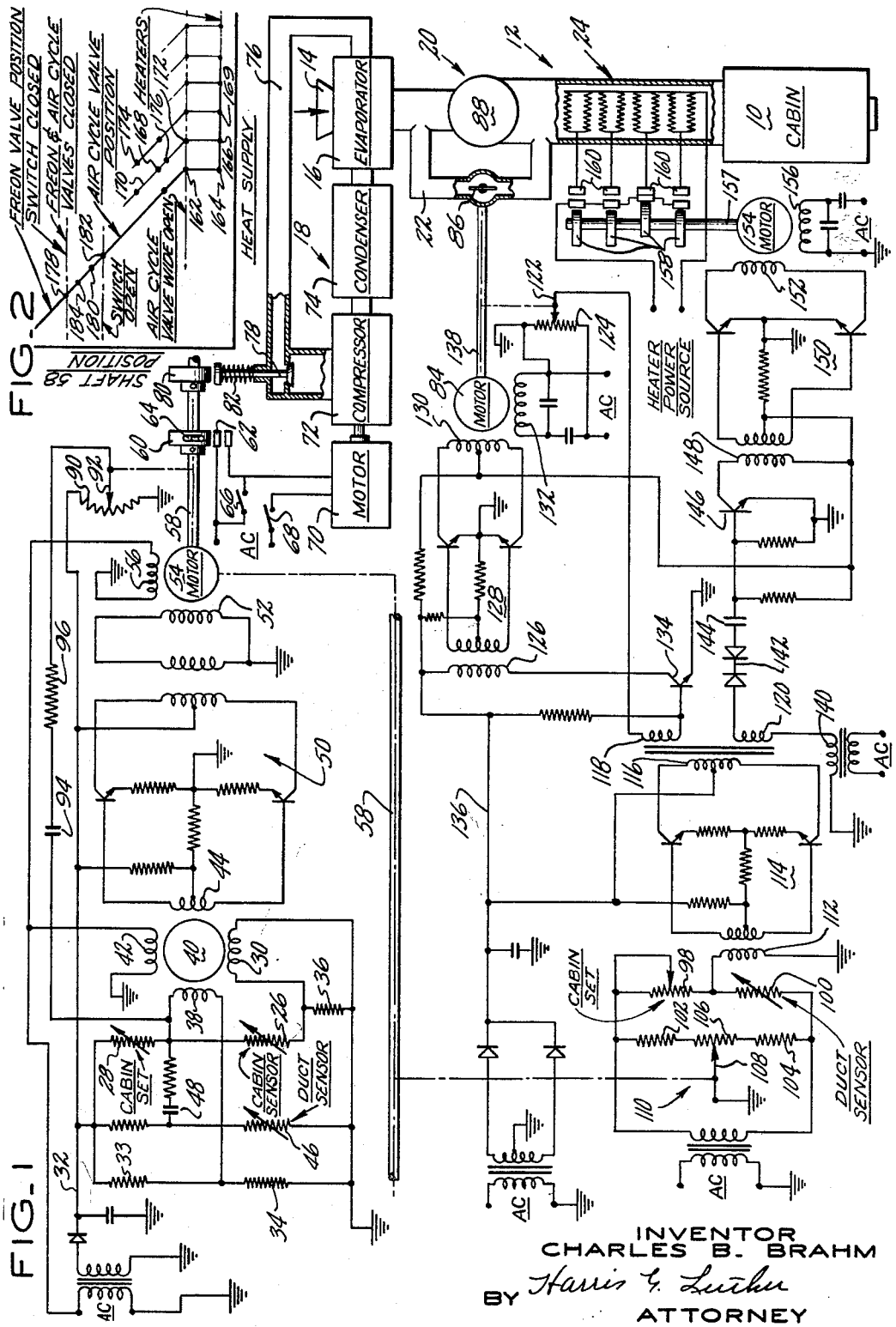

This invention relates to control mechanism, and particularly to control mechanism for air conditioning systems.

An object of this invention is mechanism responsive to selected controlled conditions for selectively activating condition controlling devices.

A further object is control mechanism selectively supplying increments of condition control and mechanism for modulating the condition between the increments.

A still further object is mechanism activating a device supplying an increment of heat greater than necessary and mechanism modulating a cooling device for reducing the effective heat supplied to supply the desired heat.

Another object is control mechanism responsive to a condition to be controlled, including means limiting the rate of control, selectively activating a series of condition controlling devices.

An additional object is control mechanism for an air conditioning system, for selectively activating in overlapping sequence, a refrigerating system, an air cycle cooling system, and an electrical heating system.

Other objects and advantages will be apparent from the following specification and the attached drawings in which:

FIG. 1 is a schematic view of the wiring diagram showing the temperature responsive controls and the mechanism controlled thereby; and FIG. 2 is a graph showing the relation between the several heating and cooling elements.

In aircraft, conditions vary so that at times it is desirable to supply heat to the cabin to maintain a comfortable temperature and at other times it is desired to extract heat or supply cooled air to reduce the cabin temperature.

In the device used to illustrate the invention, a cabin 10 is continuously supplied with air through a channel or duct indicated generally at 12 having an entrance 14 receiving air from any suitable source such as ram air or a compressor. The duct 12 leads through a heat exchanger 16 which may be cooled by a Freon or similar refrigerating system indicated generally at 18. The duct 12 also leads through an air cycle refrigerating system indicated generally at 20 having a bypass 22. A series of heating elements indicated generally at 24 are installed in the duct between the refrigerating mechanisms and the cabin to supply additional heat to the air, generally when the refrigerating systems are not being utilized; although as will appear more clearly hereinafter, both the air cycle machine and the heating units are utilized simultaneously in order to provide more accurate modulation.

In order to maintain the cabin at a selected temperature, a cabin temperature responsive sensor 26 will, upon changes in cabin temperature, alter the resistance of an element 26 and compare it with the resistance of an adjustable resistor 28. Resistor 28, element 26 and a bias winding 30 of a magnetic modulator 40, form one branch of a bridge connecting a source of D.C. voltage 32 with ground. The other branch of the bridge includes resistors 33 and 34. A resistance 36 is connected across the bias winding 30 of magnetic modulator 40 to control the current therethrough. A signal coil 38 connects the center points of the two bridge branches and upon unbalance of the bridge provides a signal for the magnetic modulator indicated generally at 40 and having an exciter coil 42 and an output coil 44. Any variation of the temperature of the cabin from a preselected temperature as indicated by the adjustable resistor 28, will produce a temperature error signal of temperature increase value, calling for an increase in cabin temperature, or temperature decrease value, calling for a decrease in cabin temperature, in the signal coil 38 and a proportional output signal in the coil 44. A temperature responsive element or temperature sensor 46 sensing duct air temperature and placed in the duct 12 adjacent the cabin is connected into the bridge as an additional branch, to provide a signal responsive to duct air temperature as registered or sensed by said temperature responsive element or sensor 46, but is isolated from the bridge midpoints by a condenser 48 and a resistor and is thus effective only to provide a bias to signal coil 38 responsive to the rate of sensed duct air temperature change. This additional branch is used only to limit the rate of change of the duct air temperature by applying a bias to the temperature error signal proportional to the rate of change.

The error signal appearing in the output coil 44 is amplified in the amplifier 50 and applied as an alternating voltage to coil 52 of the two-phase motor 54; the other phase being supplied directly from a suitable alternating voltage source to the coil 56. It will be apparent that as the cabin temperature varies above and below the datum temperature, as indicated by the adjustable resistance 28, the alternating signal appearing at 44 will be either 90° leading or 90° lagging with the alternating voltage across coil 56. Hence, the current in coil 52 whose phase and amplitude will vary with the phase and amplitude of the current in coil 44, will rotate the motor 54 in one direction when it is leading the current in coil 56, and in the opposite direction when it is lagging the current in coil 56.

Motor 54 will turn a shaft 58 which in turn controls, through mechanism to be presently described, the Freon refrigerating system 18, the air cycle refrigerating system 20 and the electric heaters. The Freon system is turned on and off by a cam 60 actuating a switch 62 and having a lost motion connection 64 indicated as a pin and slot connection between the cam 60 and the shaft 58. Manually actuated switches 66 and 68 are provided for manual control of the Freon compressor motor 70, normally controlled by the cam 60 and the switch 62. The Freon system comprises a compressor 72 driven by the motor 70 and feeding compressed Freon or other suitable refrigerant to the condenser 74 which, in turn, feeds the condensed liquid to the evaporator 16 which acts as a heat exchanger between the cold expanded Freon and the incoming cabin air. The expanded Freon is led through a duct 76 back to the inlet of the compressor 72. The duct is provided with a valve 78 which may be positioned by a cam 80 and closed by a spring 82 to thus modulate the back pressure on the evaporator and thus control the evaporator temperature in a well-known manner, in accordance with the position of shaft 58.

The rate of movement of the motor 54 is limited by means of a negative feedback comprising a D.C. potentiometer 90 whose wiper 92 is positioned by movement of the shaft 58 and which will feed a signal back to the signal coil 38 in accordance with the rate of movement of the wiper arm 92. The condenser 94 in the feedback circuit will block D.C. signals but will permit voltage variations such as are occasioned by movement of the wiper 92 to influence the signal in coil 38 and thus limit the rate of movement of the motor 54 which, incidentally, will limit the rate of change of the temperature of the air being supplied to the cabin. This rate limitation is in addition to the limitation imposed by the duct temperature sensor 46. The time constant of the resistor 96 and the condenser 94 will determine the rate limitation on the motor 54. Condenser 48 acts in a similar manner in controlling the rate of duct temperature change.

The shaft 58 also controls the air cycle system by operating the two-phase motor 84 which positions the valve 86 in the bypass 22 around the air cycle system 20. When the valve 86 is closed, the cabin air supply is expanded in the turbine 88 and thus cooled on its way to the cabin in a well-known manner. When the valve 86 is open, as indicated in the drawing, the cabin air supply is bypassed around the turbine 88 and is thus not cooled by expansion.

The air cycle mechanism is controlled by an A.C. bridge having an adjustable resistor 98 and a resistor 100, responsive to the temperature of the air in the duct as it enters the cabin, forming one branch of the A.C. bridge. The adjustable resistor 98 is set in accordance with the setting of the resistor 28 to act as a datum defining the selected cabin temperature. The other branch of the A.C. bridge comprises resistors 102 and 104 connected by an adjustable resistor 106, the position of whose slider 108 is determined by the position of the shaft 58. The resistor or potentiometer 106 is of the type having an active or potential varying portion, and an inactive or constant potential portion at one end over which the slider may travel for a considerable distance without any change in potential which, in effect, gives a dead band or lost motion connection between the shaft 58 and the resistor 106.

Movement of the slider 108 along the potentiometer 106 will unbalance the bridge and as will be explained later, will produce a signal actuating motor 84 to change the position of valve 86. As will be explained in more detail later, each position of the valve 86 requires an off temperature signal to balance it so that, in effect, for the active portion of the movement of slider 108 the shaft 58 positions the valve 86. In other words, over a selected portion of rotation of the shaft 58, the valve 86 is positioned in accordance with shaft position.

During the time that the shaft 58 is modulating the Freon system by actuation of the valve 78, the slider 108 is at the inactive portion at one end of the resistance 106 which puts such a bias on the bridge that the motor 84 has turned the valve 86 to its completely closed position and holds it there regardless of any unbalance that there may be between the duct sensor 100 and the cabin set resistor 98. As the shaft 58 turns to close the valve 78 of the Freon system, it will start the slider 108 along the active portion of the potentiometer 106 to thus start positioning the air cycle mechanism after the Freon system has been rendered inactive.

Any unbalance in the bridge 110 appears as a signal in the coil 112 which is connected with the slider 108 across the midpoints of the bridge. This signal is amplified in amplifier 114 and appears as in alternating current signal in the primary of the transformer 116 having secondary coils 118 and 120. Coil 118 is in series with a slider 122 movable along a potentiometer 124 connected across a source of alternating current to supply a voltage bucking the voltage produced in coil 118 by a signal from the bridge 110. Any unbalance between the voltages in coils 118 and the selected portion of the potentiometer 124 is amplified and appears as a signal in coil 126 which is coupled to amplifier 128 which applies the amplifier signal to the winding 130 of two-phase motor 84 having its other winding 132 connected to a source of alternating current. The transistor 134, whose base is influenced by any unbalance between the alternating current voltages in coils 118 and the selected portion of the potentiometer 124, is continuously biased by a direct current in the line 136 so as to be continuously conducting and it will, therefore, pass alternating current applied to its base as long as the negative portion of the alternating voltage is not greater than the bias. As the alternating voltages in 118 and 124 are bucking, that is, 180° out-of-phase, the phase of the alternating current in coil 126 will depend on whether the voltage in 118 or 124 predominates. This phase reversal will, of course, result in a movement of the motor 84 in one direction or another to operate the valve 86. It will thus be seen that the valve 86 is positioned in accordance with the value of the voltage signal in coil 118 as the slider 122 is moved in accordance with movement of the shaft 138 by the motor 84 to provide a bucking signal for the signal in coil 118 proportional to the position of the shaft 138 and the valve 86. While the valve 86 is under control of the motor 84, any unbalance between the duct sensor 100 and the cabin set 98 will have a correcting effect upon the valve as it affects the balance of the bridge. When, however, the valve is at its extreme positions of either open or closed, the unbalance between 100 and 98 obviously cannot act to further open the already open valve, or to further close the already closed valve.

The secondary coil 120 is connected with a secondary coil 140 of an alternating current transformer whose primary is connected to a suitable source of alternating current to provide a voltage bucking the voltage in coil 120. The unbalance between coils 120 and 140 is led through a Zener diode 142 and a capacitor 144 to the base of a transistor 146 which is continuously biased from a direct current source 136 in a manner similar to the way diode 134 is biased. Any alternating signal passing through condenser 144 is amplified and fed to coil 148 and amplifier 150 and thence to winding 152 of the two-phase motor 154 whose other winding 156 is connected across a suitable source of alternating current. The phase of the current in coil 152 will depend upon whether the voltage in coil 140 or coil 120 predominates and this phase will, of course, determine the direction of rotation of the motor 154. The Zener diode 142, which requires a predetermined potential before it will break down and transmit in either direction, provides a dead band in the signals transmitted to the motor 154. As long as the signals in 116 and 118 are large enough to position the valve in anything but its nearly wide open positions, the signals in coil 120 will predominate over the voltage in 140 and drive the motor 154 to its extreme limit in one direction. The motor 154, which drives shaft 157 and a series of cams 158 which selectively operate switches 160 connected to the respective coils in the heater 24, when moved by the predominating signal in coil 120, turns the shaft 157 to open all of the switches. When the voltage in coil 140 predominates, the motor will be turned in the opposite direction to close the switches 160 in a preselected order. The heater coils are arranged to supply heat in steps or increments so that one coil will supply 10 percent of the total heat possible from the heater, a second coil will supply 20 percent of the heat, a third coil 30 percent and a fourth coil 40 percent. By energizing the coils either singly or in suitable combinations, it is, of course, possible to supply increments of heat by 10 percent of the total up to the full capacity of the heater.

FIG. 2 is a graph of shaft position against heat supply, positive or negative, and as indicated above, for a certain portion of the shaft 58 position there is a corresponding position of the valve 86. At the position of the shaft indicated by numeral 162, the valve 86 is in wide open position and further rotation of the shaft 58 will move the slider 106 to reduce the voltage in coil 120 so that the voltage in coil 140 will predominate so as to operate the motor 154 and close the first one of the switches 160 to bring in 10 percent of the heater capacity. This point of the shaft position is indicated at 164. The heat added is represented at the point 166 which will, due to the increase in cabin temperature, cause the shaft 58 to rotate in the opposite direction until the shaft reaches a position indicated by the point 168 where the valve 86 will have been closed to provide some cooling and rotation of shaft 58 stopped by reduction of cabin temperature as indicated by the line 170. If the cabin continues to be too cool, the shaft 58 will again be rotated to open the valve 86 and reduce the cooling effect of the air cycle device until the point 172 is reached at which time the shaft will continue to rotate and as before, will energize the motor 154 to turn on the second of the heaters which will supply heat as indicated at point 169 and the previous cycle will again be repeated. Thus, while the cabin requires more heat, the air cycle valve will open wide and the heaters will be turned on and then the air cycle valve will be partially closed to compensate for the excess heat provided by the heaters and will modulate the heat in the air supply to the cabin. This cycle will, of course, be repeated until the full capacity of the heaters is attained and the motor 154 driven against a stop.

If while any of the heaters are turned on the cabin becomes too warm, the shaft 58 will be rotated to close the valve 86, until a position is reached such as indicated at 174 where the voltage in coil 120 will become enough greater than the voltage in coil 140 to pass through the Zener diode 142 and operate the motor 154 to open one of the switches 160 and cut out the appropriate heater. The cooling of the cabin occasioned by the cutting out of the heater, will cause the shaft 58 to rotate in the opposite direction and position the valve 86 at a point such as 176 where it will act to oppose the effect of the heater then in operation and modulate the heat supply in accordance with the position of the shaft 58. The cycle will repeat until all the heaters have been disconnected and the motor 154 turned against a stop. Any further reduction in heat supply would then be brought about by further closing the valve 86 for the air cycle system until the valve 86 is substantially fully closed, as indicated at point 178 of the graph, at which time the Freon valve 78 will start to open and the switch 62 will be closed to start the Freon compressor. Starting of the Freon compressor will produce additional cold or remove additional heat and cause the shaft 58 to rotate in the opposite direction, and again open the valve 86 as indicated at 180 to reduce the cooling effect, and compensate for the starting of the Freon compressor. The lost motion provided by the pin and slot connection 64 for the cam 60, will allow the Freon compressor to continue to run while the valve 86 is being opened. If the cabin continues to be too warm, the shaft 58 will rotate to again close the valve 86 and then proceed to add the cooling effect of the Freon compressor to that of the air cycle mechanism.

In conditions where the Freon compressor is operating and the cabin is too cold, the shaft 58 will turn to close the valve 78 and start to open the valve 86 and will then open the switch 62 as indicated at 182, stopping the Freon compressor. The added temperature incident to stopping the Freon compressor will cause the shaft 58 to rotate in the opposite direction, closing the valve 86 as indicated at 184 to compensate for the additional heat, but the lost motion in the pin and slot connection 64 will prevent the Freon compressor from again starting.

From the above description, it will be seen that I have provided cabin temperature responsive mechanism which, as the cabin calls for an increase in temperature, will gradually reduce the output of a first refrigerating system, and then shut it off, then reduce the output of a second refrigerating system in series with the first, and then turn on a series of electric heaters. A lost motion connection is provided in the shut-off mechanism of the first refrigerating system to permit modulation of the second refrigerating system in the dead band thus provided and compensate for the change in cooling incident to starting and stopping of the first system. A dead band is also provided in the signals required for operating the mechanism for turning the heaters on and off so as to permit modulation of the second refrigerating system within the dead band to compensate for the large changes in heat incident to turning the heaters on and off.

If the duct temperature differs materially from the cabin datum temperature while the heaters are in operation, the duct sensor 100 will act to change the balance of bridge 110 and turn some of the heaters off or on or slow up the addition or subtraction of others. If the duct temperature differs materially from the cabin datum temperature while the air cycle system is controlling, the unbalance in the bridge will act to bias the valve 86 to reduce the difference.

If the cabin temperature differs materially from the cabin datum temperature so as to induce a rapid rotation of shaft 58, the voltage change in wiper 92 actuated by shaft 58 will oppose the temperature difference signal and limit the rate of shaft rotation. In a similar manner, if a rapid change takes place in the duct temperature as registered by resistor 46 for any reason, but usually due to a rapid rotation of shaft 58, a signal will be supplied which will urge shaft 58 in a direction to reduce the rate of duct temperature change.

All of the A.C. sources indicated are of the same frequency and phase.

I claim:

1. In an air conditioning system, in combination, means producing error signals of temperature increase value, calling for an increase in temperature, and temperature decrease value, calling for a decrease in temperature, responsive to departure of the temperature of a selected region of said system in a decrease direction or an increase direction respectively, from a datum temperature, heating elements providing increments of heat in steps, mechanism responsive to an error signal of predetermined amount of temperature increase value activating said heating elements in steps and producing increments of heat in said system larger than the amount necessary to correct the temperature departure causing the error signal, said increments producing an error signal of temperature decrease value, said mechanism responsive to an error signal of a predetermined amount of said temperature decrease value inactivating said heating elements, and producing a dead band of control of said heating elements between said activating and inactivating signals, cooling means extracting heat from said system, control means for said cooling means responsive to said error signals of said temperature increase value rendering said cooling means ineffective before activation of said heating elements, and responsive to error signals of said temperature decrease value within said dead band rendering said cooling means effective within said dead band after activation of said heating elements.

2. A combination as claimed in claim 1 in which the heating elements comprise a series of individual elements and the activating mechanism activates them individually and selectively in series to provide a plurality of individual increments of heat.

3. In combination, two refrigerating systems and a heating system arranged in series to control temperature at the outlet of the series, one of said refrigerating systems increasing the cooling effect by a relatively large step when first turned on and correspondingly decreasing the cooling effect upon being turned off, means for turning said one of the refrigerating systems on and off independent of said heating system, said heating system increasing and reducing the heat supply in a relatively large step when first turned on and upon being turned off respectively, means for turning the heating system on and off independent of said one refrigerating system, means for modulating the second refrigerating system alone, in combination with said one refrigeration system, or in combination with said heating system, means connecting said modulating means with both of said turning means including a separate lost motion connection between said modulating means and each turning means whereby said second refrigerating system provides heat modulation compensating for said relatively large step of said one refrigerating system and said heating system.

4. In combination, temperature control means selectively combining the output of two refrigerating systems and a heater comprising, a first refrigerating system and means modulating the output of said system, a second refrigerating system supplementing the output of said first system, said second refrigerating system increasing the cooling effect by a relatively large step when first turned on and correspondingly decreasing the cooling effect upon being turned off, means for starting and stopping said second system, a lost motion connection between said modulating means and said starting and stopping means to provide modulation to compensate for the effects of starting and stopping said second system, a heating system supplementing said first refrigerating system only, said heating system increasing and reducing the heat supply in a relatively large step when first energized and upon being de-energized respectively, means for energizing and de-energizing said heating system, a dead band connection between said modulating means and said energizing and de-energizing means to provide modulation to compensate for the effects of energizing and de-energizing said heating system.

5. An air temperature regulating device for air supplied to an enclosure comprising a master control positioned by variations in the temperature of said air from a selected datum, a duct supplying said air, means for cooling the air in said duct, means positioned by said master control for modulating said cooling means in accordance with the position of said master control, means responsive to the rate of movement of said master control opposing the effect of said temperature variations and limiting said rate of movement.

6. A regulating device as claimed in claim 5 including a duct air temperature sensor for sensing the duct air temperature, means responsive to the rate of change of the sensed temperature of air in said duct for also limiting the rate of movement of said master control.

7. In combination with an enclosure, an air temperature regulating device for said enclosure comprising a master control positioned by variations in the air temperature of the enclosure from a selected datum, a duct leading air to said enclosure, a first means for cooling the air in said duct, means positioned by said master control for modulating said cooling means in accordance with the position of said master control, means responsive to the rate of movement of said master control opposing the effect of said temperature variations and limiting said rate of movement, means responsive to the rate of change of temperature in said duct for also limiting the rate of movement of said master control, a second means for cooling the air in said duct in series with said first cooling means, means positioned by said master control for modulating said second cooling means in accordance with positions of said master control different from the positions used for modulating said first cooling means, means responsive to variations of the air temperature in said duct from a selected datum modifying the modulation of said second cooling means as determined by the position of said master control, a heating means arranged in series with said first and second cooling means for heating the air in said duct, and means responsive to a position of said master control for activating said heating means after both said cooling means have been disabled.

8. A regulating device as claimed in claim 7 in which said heating means comprises a series of independent heating elements each producing a predetermined increment of heat, and said device includes means for activating said elements seriatim and oscillating said master control between activation of said elements to modulate said second cooling means.

9. In combination, a master control positioned by variations of air temperature from a datum value, a transformer, means energizing the primary of said transformer proportional to the position of said master control, a pair of secondaries in said transformer producing A.C. signals proportional to the energization of said primary, a cooling system varying said temperature, a heating system varying said temperature, a control for said cooling system positioned in accordance with the strength of the signal from one of said secondaries, means providing a fixed A.C. signal continuously opposing the signal from the other secondary, means controlling said heating system including means actuating said heater control in one direction as long as one of said opposing signals exceeds the other by a predetermined amount and actuating said heater control in the opposite direction as long as the other signal exceeds the one by said predetermined amount and providing a dead band of no control between said opposite predetermined fixed amounts.

10. A combination as claimed in claim 9 in which the fixed A.C. signal providing means provides a signal which does not exceed the opposing signal from said other secondary until the signal from said one secondary has moved the control for said cooling system to the least cooling position.

11. A combination as claimed in claim 10 in which the heating system comprises a series of consecutively energizable individual heater elements each providing a material fixed increment of heat, and the heating and cooling systems control the temperature of air in a duct supplying said air to said master control and including means controlled by variations of the air temperature in said duct from a predetermined datum arresting actuation of said heater control and positioning the control for said cooling system to provide modulation between energization of said individual heater elements.

12. A combination as claimed in claim 11 in which change in air temperature, positioning said master control, due to energization of the heating system, positions said master control to also arrest actuation of said heater control and provide modulation of said cooling system between energization of said heater elements.

13. A combination as claimed in claim 9 in which the means controlling said heating system includes a Zener diode establishing said predetermined amount.

14. An air temperature regulating device comprising a master control subjected to regulated air and positioned by variations in the temperature of the regulated air from a selected datum, a duct conducting air to be regulated, a first means for cooling the air in said duct, a second means for cooling the air in said duct, and means for heating the air in said duct arranged in series along said duct, said heating means comprising a series of individual heating elements each providing a material fixed increment of heat, means actuated by said master control as it moves due to a below datum temperature in the regulated air for modulating and then disabling said first cooling means, then modulating and then disabling said second cooling means and then activating said individual heating elements seriatim, all of said individual heating elements being activatable from a single preselected position of said master control, said means for activating said heating elements including a connection including a dead band between the master control and said heating activating means providing means for oscillating said master control to and from said preselected position and modulating said second cooling means between activation of successive individual heating elements.

15. A master control positioned by air temperature error, means actuated by said control producing a pair of signals each proportional to the position of the master control, a cooling system, means actuated by one of said signals positioning the control of said cooling system in accordance with the value of said one signal to modulate the cooling effect of said cooling system, a heater having a substantially fixed increment of heat, a heater control, means actuated by the other signal, when, moving in one direction, it reaches a first selected value, after the cooling system due to movement of said one signal in said one direction has been set at the least cooling position by its control, actuating said heater control to energize said heater and heat said air, said other signal actuating said heater control to de-energize said heater when said other signal, moving in the other direction, reaches a second selected value spaced from said first value and said one signal, moving in said other direction, has correspondingly changed to position said cooling system control to utilize a portion of said cooling system output to modulate the cooling effect and means preventing actuation of said heater control when said other signal is between said first and said second value where said one signal is modulating said cooling system.

References Cited in the file of this patent
UNITED STATES PATENTS

| | | |
|---|---|---|
| 1,550,779 | Carpenter | Aug. 25, 1925 |
| 2,474,441 | Sparrow | June 28, 1949 |
| 2,632,307 | Massey et al. | Mar. 24, 1953 |